United States Patent [19]

Schwarz et al.

[11] Patent Number: 5,028,078
[45] Date of Patent: Jul. 2, 1991

[54] TUBE FITTING WITH VARIABLE TUBE INSERTION

[75] Inventors: Albert J. Schwarz, Lincolnwood; Anthony M. Pietramale, Schaumburg; Richard W. Moerhing, Westchester, all of Ill.

[73] Assignee: The Pullman Company, Livingston, N.J.

[21] Appl. No.: 474,878

[22] Filed: Feb. 5, 1990

[51] Int. Cl.⁵ .............................. F16L 25/00
[52] U.S. Cl. ............................ 285/12; 285/39; 285/382.7
[58] Field of Search ............ 265/382.7, 12, 39, 341, 265/342, 343

[56] References Cited

U.S. PATENT DOCUMENTS

| | | | |
|---|---|---|---|
| 2,405,489 | 8/1946 | Brock | 285/382.7 X |
| 2,475,026 | 7/1949 | Hynes et al. | 285/382.7 X |
| 2,484,815 | 10/1949 | Crawford | 285/382.7 X |
| 3,290,064 | 12/1966 | Davis | 285/382.7 X |

*Primary Examiner*—Dave W. Arola
*Attorney, Agent, or Firm*—Russell E. Baumann

[57] ABSTRACT

A flareless fitting includes a coupling body, a coupling nut and a ferrule. A tube is inserted so that it may extend axially inwardly a variable insertion length beyond the ferrule, through the length of a counterbore which is slip fit about the tube. Tightening of the coupling nut and the tapered arrangement causes the ferrule to be sealed between the tube outer wall and the internal cylindrical surface of the coupling body. Specifically, a single tube fitting system is provided which offers substantial tube penetration, or shallow tube penetration, without using two different kinds of fittings.

6 Claims, 3 Drawing Sheets

TUBE FITTING WITH VARIABLE TUBE INSERTION

FIELD OF THE INVENTION

This invention relates to tube fittings and, more particularly, to fittings for coupling straight-ended tubes.

BACKGROUND OF THE INVENTION

Flareless, or "bite-type" tube fittings are used to make a strong, fluid-tight connection to the end of a conduit or tube. Such fittings typically employ a tapered arrangement to force one or more ferrules against the outer wall of the tube, biting into it to obtain both a proper seal and grip.

An example of one known type of flareless fitting is shown in Crawford U.S. Pat. No. 2,484,815. This patent discloses a tube fitting comprising a coupling body, a coupling nut and a ferrule. The tube is inserted so that it extends substantially axially inwardly beyond the ferrule, through the length of a counterbore which is slip fit about the tube. Tightening of the coupling nut and the tapered arrangement causes the ferrule to be swaged between the tube outer wall and the internal cylindrical surface of the coupling body.

Another type of flareless fitting is shown in Davis U.S. Pat. No. 3,290,069 which differs from the Crawford fitting in that the fitting body lacks a counterbore, so that the tube cannot penetrate much beyond the inner end of the ferrule. The fitting in the Davis patent is particularly advantageous when tubing installations must be made in close-quarter cramped locations because the fitting and the ferrule, which becomes permanently attached to the tubing when the connection is completed, can be more easily separated from the coupling body when repair or replacement work is needed. The tube need be moved or sprung only a short axial distance from the body when it is disassembled or reassembled.

Conversely, the fitting shown in the Crawford patent requires substantially more axial movement when disassembly or reassembly is done, since the tube end must be axially outward of the body cavity before it can be moved aside.

The fitting shown in the Crawford patent has certain advantages if disassembly is not a problem because the angularity and concentricity of the tube relative to the body are less crucial, since the counterbore acts to locate the tube so that it will be properly located and aligned relative to the fitting body. Therefore, less care is needed in seeing that the tube end is cut squarely since the end is farther removed from the end of the ferrule.

In fact, the Crawford fitting effectively requires that the tube extend substantially axially inwardly beyond the ferrule. Otherwise, the swaging action of the ferrule between the tube and the coupling body could cause the end of the tube to collapse resulting in a defective fitting connection. The ferrule described by Davis can be nearly flush with the end of the tube as the teeth of the ferrule are disposed axially outwardly thereof where the tube is less susceptible to collapsing.

It is therefore desirable to have a tube fitting including the advantages of both of the above-described fittings.

SUMMARY OF THE INVENTION

It is an object of the invention to provide a tube fitting which allows for variable tube insertion.

Specifically, a single tube fitting system is provided which offers substantial tube penetration, or shallow tube penetration, without using two different kinds of fittings. Specifically, such a fitting includes a body member with an internal cylindrical bore having an opening through the outer end. The bore comprises a terraced bore having an enlarged diameter through a substantial portion of the cylindrical bore from the outer end ending with a shoulder to provide a tube stop. An axially outwardly widening annular first cam surface is concentric about the bore opening. A nut member having a bore defining a second cam surface includes an axially inner, axially outwardly narrowing frusto-conical portion and a contiguous axially outer cylindrical portion. Cooperating means in the body member and nut member forcibly advance the second cam surface toward the inner end of the body member. An annular sleeve member has an axial inner portion, a contiguous axially outer portion and an axial bore therethrough. The axial inner portion of the sleeve member includes a radially outer, outwardly widening third cam surface for engagement with the first cam surface of the body to constrict the axially inner portion of the sleeve member radially inwardly as a result of advancement of the sleeve member toward the outer end of the body. The axial inner portion further includes an axially inner, radially inner annular recess defining an annular edge gripping into the wall of a tube end extending coaxially through the nut member and sleeve member bores into engagement with the tube stop of the body member. The axially outer portion of the sleeve member includes a radially inner, axially outwardly narrowing annular surface provided with radially inwardly projecting means for biting into the wall of the tube end and further including a radially outer, axially outwardly narrowing fourth cam surface for engagement by the second cam surface of the nut member to constrict the axially outer portion of the sleeve member radially inwardly as a result of advancement of the nut member toward the outer end of the body member.

In accordance with the invention, the tube can be inserted into the counterbore a variable length, provided that the tube extends through the ferrule any distance up to the bore shoulder.

More specifically, the tube may extend substantially axially inwardly beyond the ferrule so that the counterbore acts to locate the tube relative to the fitting body. Alternatively, the tube may be inserted a shallow distance axially inwardly beyond the ferrule for use in close-quarter cramped locations.

Further features and advantages of the invention will readily be apparent from the specification and from the drawings.

DETAILED DESCRIPTION OF THE INVENTION

Figure 1:
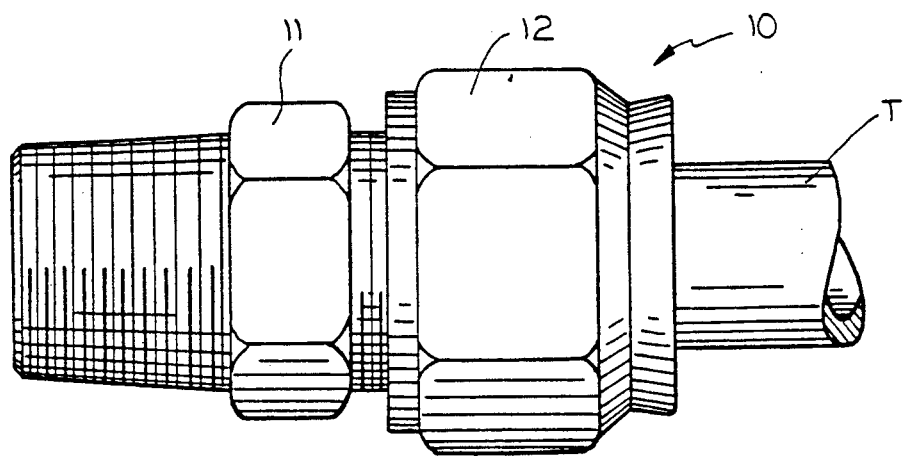
FIG. 1 is a side elevation of a fitting embodying the invention, having a portion of the tube end connected thereto.

In the exemplary embodiment of the invention as disclosed in the drawing, a fitting generally designated 10 is shown to comprise a body member 11, a nut member 12, and a sleeve member 13. The nut member 12 is arranged to be threadably connected to the body member 11 with the sleeve member 13 disposed therebetween so that upon advancement of the nut member 12 toward the body member 11, the sleeve member 13 is constricted into sealing supporting engagement with the straight end 14 of a tube T to be connected, such as a metallic tube, thereby to sealingly connect the tube end 14 to the body member 11 for sealingly coupling the tube end 14 to another element (not shown).

The present invention comprehends an improved fitting arrangement wherein the sleeve member 13 provides a plurality of sealing engagements with the tube end 14 and a plurality of spaced supports at the tube end 14 for effecting a substantially improved coupling of the tube end 14 in a novel and simple manner. Further, the improved fitting arrangement provides the user an option of variable tube insertion for effecting the desired sealing engagement.

More specifically, the body member 11 includes an axially inner end 15, a mid-portion 16, and an axially outer end 17 with a terraced bore 18 extending coaxially successively through the different portions of the body member. Specifically, the bore 18 includes an axially outer portion 18-0 extending through the axially outer end 17, and an axially inner portion 18-I extending substantially through the axial inner end 15 and the mid-portion 20. Specifically, the outer diameter of the bore outer end 18-0 is greater than the outer diameter of the tube end 14, while the inner diameter of the bore inner portion 18-I is less than the outer diameter of the tube end 14 to define a shoulder 18-S therebetween. The inner end 15 of the body member 11 may be further provided with a threaded outer surface 19 for threaded engagement with an element (not shown) to which the tube end 14 is to be connected. The mid-portion 16 may be provided with a plurality of annularly arranged flats 20 to be engaged by a suitable tool such as a wrench (not shown) as in make-up of fitting.

The outer end portion 17 of the body member 11 is provided with an external thread 21, and it is defined internally by a radial shoulder 22 into which the bore outer end 18-0 opens coaxially. The shoulder 18-S effectively defines a tube stop against which the distal end 23 of the tube end 14 abuts in one made-up arrangement of the fitting. Extending axially outwardly from the shoulder 22 is a frusto-conical, axially outwardly widening, first cam surface 24.

The nut member 12 includes an axially inner portion 25 having an internal thread 26 arranged for threaded association with the body member thread 21 for selective advancement and withdrawal of the nut member 12 relative to the body member 11 as an incident of rotation of the nut member 12 relative to the body member 11. The nut member 12 may be provided exteriorly with a plurality of flats 27 for engagement by a suitable tool such as a wrench (not shown) in the make-up of the fitting.

Figure 2:
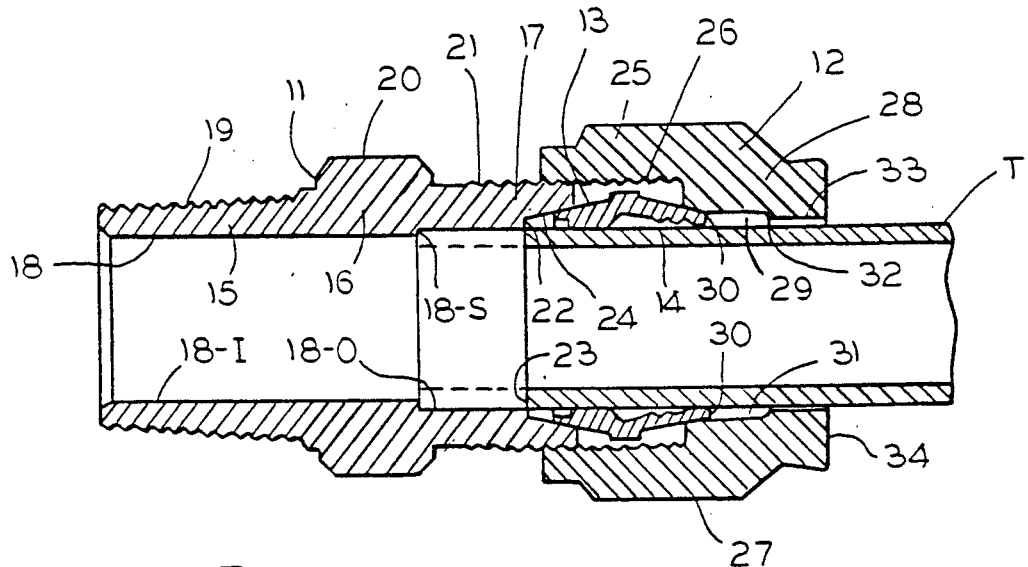
FIG. 2 is a diametric section of the fitting of FIG. 1 with the elements arranged as at the beginning of a makeup thereof.

The axially outer end portion 28 of the nut member 12 is radially inwardly defined by a second cam surface 29 including an axially inner, axially outwardly narrowing frusto-conical surface portion 30 and a cylindrical surface portion 31 extending axially outward from the frusto-conical portion 30. A frusto-conical, axially outwardly narrowing, surface portion 32 extends axially outwardly from the outer end of the cylindrical portion 31 into a cylindrical portion 33 opening through the outer end 34 of the nut member 12. As best seen in FIG. 2, the diameter of the cylindrical surface 33 is slightly larger than the outer diameter of the tube end 14.

The sleeve member 13 includes an axially inner portion 35, a mid-portion 36, and a contiguous axially outer portion 37. An axial bore 38 extends through the sleeve member 13. The axially inner portion 35 includes a radially outer, outwardly widening, third cam surface 39 which is frusto-conically complementary to the frusto-conical first cam surface 24 of the body member 11. The axially inner portion 35 of the sleeve member 13 further includes an axially inner, radially inner annular recess 40 defining a annular gripping edge 41. The recess 40 is defined at its axially outer end by an axially outwardly narrowing, frusto-conical end surface 42. The portion 43 of the bore 38 disposed within the axially inner portion 35 of the sleeve member 13 is cylindrical and has a diameter slightly greater than the outside diameter of the tube end 14.

Figure 5:
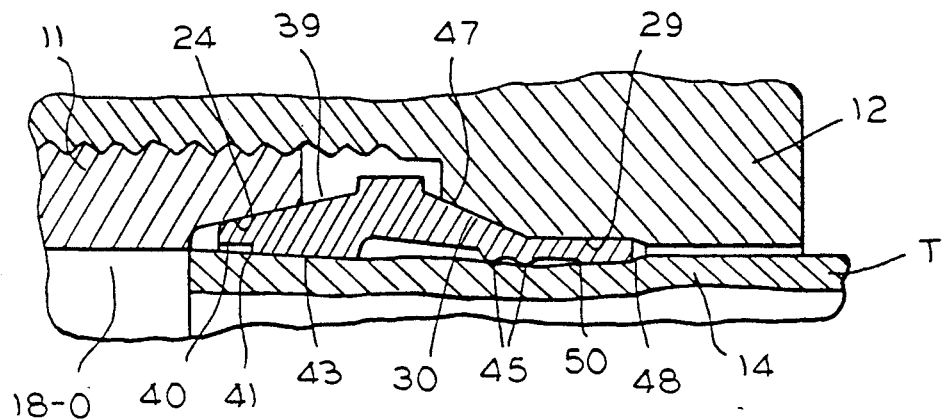
FIG. 5 is a fragmentary enlarged diametric section of a portion of the fitting as arranged in FIG. 3.

The mid-portion 36 of the sleeve member 13 includes a radially inner, axially outwardly narrowing, annular surface 44 provided with a plurality (herein two) of radially inwardly projecting ribs 45 for sealingly biting into the wall of a tube end 14 in the made-up arrangement of the fitting, as shown in FIG. 5. That is, these sharp ribs 45 press deeply into the outer surface of the tube wall in such arrangement. The mid-portion 36 of the sleeve member 13 is defined exteriorly by an axially outwardly narrowing, frusto-conical fourth cam surface 47 arranged to be engaged by the second cam surface 29, 30 of the nut member 12 to constrict the mid-portion of the sleeve member 13 radially inwardly to the made-up arrangement of the fitting, as shown in FIG. 5.

The axially outer portion 37 of the sleeve member 13 includes a radially inner cylindrical surface 48 having a diameter slightly greater than the outside diameter of the tube end 14. The axially outer end of the sleeve member is further defined by a radial surface 49 at the inner end of the cylindrical surface 48 and defining at the junction therewith a sharp annular biting edge 50 arranged to bite into the tube 14 in the made-up arrangement of the fitting, as shown in FIG. 5. The outer portion 37 of the sleeve member 13 is defined exteriorly by a frusto-conically axially outwardly narrowing fifth cam surface 51 which comprises an extension of the cam surface 47. The radial constriction of the end portion 37 of the sleeve member 13 effected by engagement of the nut member cam surfaces 29 and 30 with the cam surface 51 of the sleeve member effects a radial constriction of the outer portion 37 to cause the surface 48 therewith to be in intimate facial engagement with the tube wall in the made-up arrangement of the fitting, and the sharp edge 50 to be pressed into the outer surface of the tube wall in such arrangement.

In one specific illustrative embodiment of the invention, the fitting 10 is arranged at the angle of the frusto-conical cam surface 39 relative to the axis of the fitting being approximately twelve degrees, the angle of the frusto-conical cam surface 47 relative to the axis of the fitting being approximately eight degrees, the angle of the frusto-conical surface 42 to a plane radial to the axis of the fitting being approximately two degrees, and the angle of the frusto-conical surface 44 to the axis of the fitting being approximately five degrees. The diameter of the cylindrical surface 48 is preferably larger than the outer diameter of the tube end 14 by approximately one-half the height of the adjacent annular rib 45. Between the outermost rib 45 and the planar surface 49, the mid-portion 37 of the sleeve member 13 may be defined by a cylindrical surface 53. The annular ribs 45 may have identical construction and, herein, are defined by an included angle of approximately sixty degrees symmetrical about a radial line extending at an angle of approximately seventy-five degrees to the axis of the fitting. The sleeve member may be formed of a suitable material, such as brass, steel or hard plastic.

Figure 8:
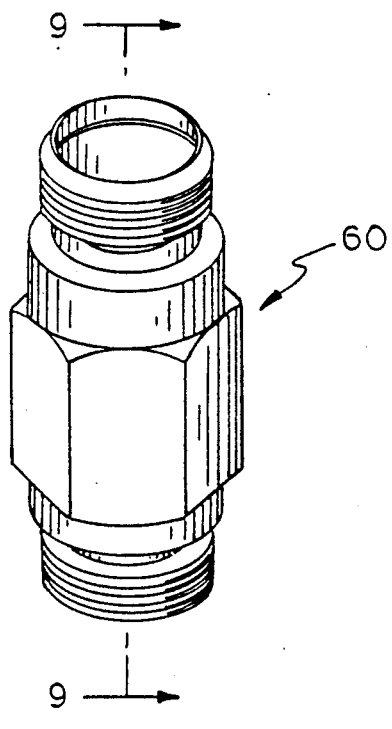
FIG. 8 is a perspective view of a presetting tool according to the invention.
Figure 9:
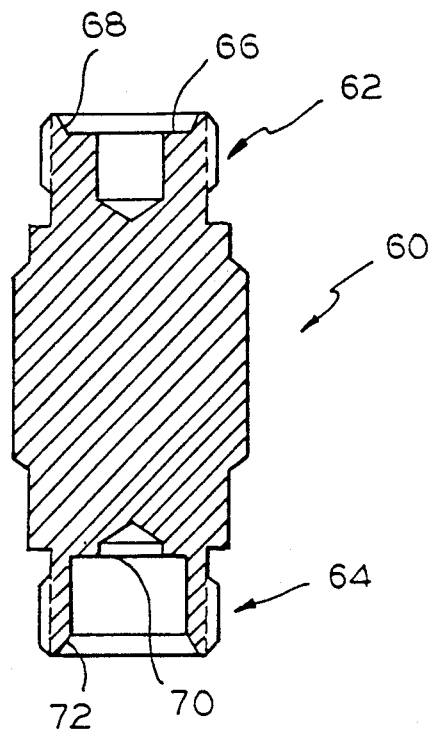
FIG. 9 is a sectional view taken along the line 9—9 of FIG. 8.

The make-up of the fitting 10 is as follows. The nut member 12 and sleeve member 13 are firstly installed over the tube end 14 to be connected. A presetting tool 60, see FIGS. 8 and 9, may be used to provide axial location of the sleeve member 13 relative to the tube end 14 and to guide the user in tightening the nut to a point where a minimum of additional tightening will be needed to properly make up the fitting. Specifically, the presetting tool 60 includes a first, or shallow end 62, and a second, or deep, end 64. Specifically, the shallow end 62 is used to simulate the body member 11 wherein the tube end 14 will be extended a shallow distance, as illustrated in solid line in FIG. 2. Conversely, the deep end 64 is used to simulate the tube end 14 being extended fully to the shoulder 18-S, as illustrated in phantom line in FIG. 2.

More particularly, the shallow end 62 includes a bore 66 defining an outwardly widening frusto-conical surface 68. The depth of the bore 66 is approximately that required for shallow insertion, although slightly less than the depth of the body member first cam surface. Similarly, the deep end 64 includes a longer bore 70 connecting to a frusto-conical outwardly widening end 72. The length of the bore 70 from the outer portion 72 is determined to be approximately equal to the length between the body member shoulders 18-S and 22, although slightly less.

Figure 3:
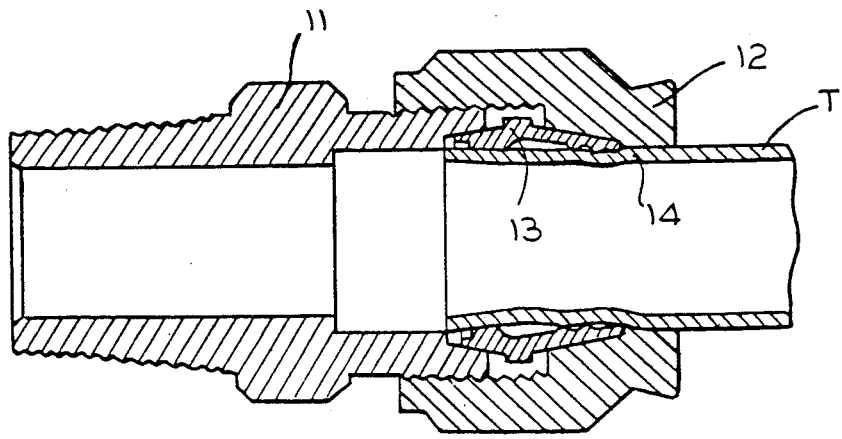
FIG. 3 is a diametric section of the fitting of FIG. 1 with the elements arranged as at the completion of a makeup thereof.
Figure 4:
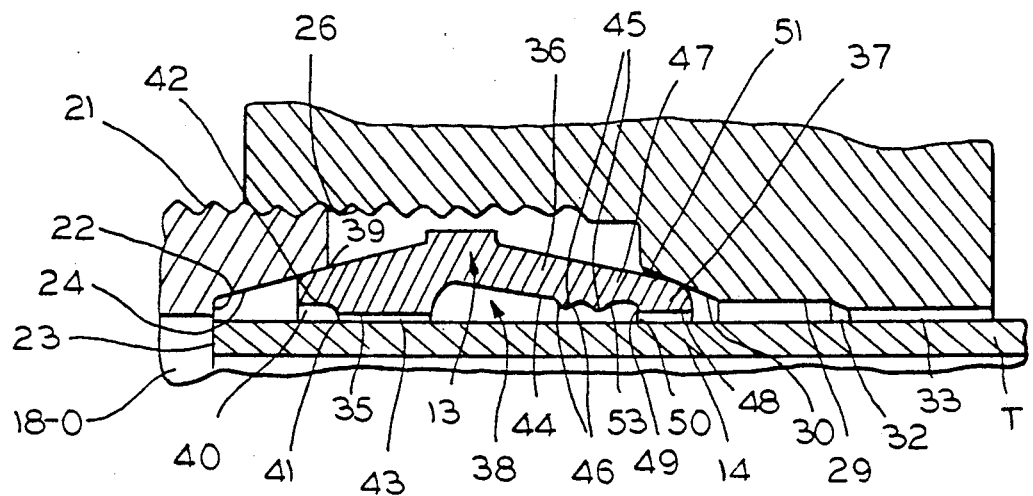
FIG. 4 is a fragmentary enlarged diametric section of a portion of the fitting as arranged in FIG. 2.

With the sleeve member 13 properly located on the tube end 14, the nut member 12 is then threaded onto the body member surface 21 by finger tightening to the arrangement of FIG. 2 wherein the sleeve member 13 is retained between the body member surface 24 and the nut member surface 30. The nut member 12 is then forcibly threaded onto the body member 11 to the position of FIG. 3. As a result of the threaded advancement, the cam surfaces 29 and 30 of the nut member 12 move axially toward the body member 11 forcing the sleeve member 13 slightly axially inwardly, or the left as shown in FIG. 2, and causing the annular edges 41 and 50 to grip and sealingly engage the tube end 14. At the same time, the radial constriction of the axially outer end portion 37 of the sleeve member 13 causes the cylindrical surface 48 to have a positive facial gripping engagement with the inner surface of the outer surface of the tube wall to provide improved support of the tube at the inner end of the fitting. Still further, the radially inward constriction of the mid-portion of the sleeve member causes the annular ribs 45 to bite into the tube wall and provide the primary and mandatory gripping retention of the tube end 14 by the sleeve 13 to prevent axial displacement of the tube end 14 away from the body member 11 after the fitting is made up. At the same time, the biting engagement of the annular ribs 45 into the tube wall provide a primary seal of the sleeve 13 to the tube wall at this point. Still further, the cylindrical surface 43 of the fitting is brought into facial supporting engagement of the tube wall adjacent the nose portion of the sleeve member to provide a further support of the tube in the fitting upon completion of the make-up thereof, as shown in FIG. 3.

Thus, the tube end 14 is supported at each of the inner and outer ends of the sleeve member by the facial engagements of the cylindrical surfaces 43 and 48 therewith. The sleeve is sealingly engaged with the tube at each of the annular edges 41 and 50 and each of the annular ribs 45 to provide four retaining portions of the sleeve relative to the tube wall. Each of the edges 41 and 50 and ribs 45 provides an additional function of the sealing connection of the sleeve member to the tube T. The forceful wedging action of the axially inner portion 35 of sleeve member 13 between the tube wall and the caming surface 24 provides an improved seal between the sleeve and the body member to complete the sealed connection of the tube to the body member.

Disassembly of the fitting at any time is extremely simple. The user need merely withdraw the nut member 12 by a suitable reverse rotation thereof to back the nut member 12 away from the sleeve member 13 fixed to the end of the tube 14 until the nut member 12 becomes fully separated from the body member 11, permitting the tube end 14 with the sleeve member 13 mounted thereon to be withdrawn from the body member 11 as desired. Particularly, the amount of withdrawal of the tube end 14 depends upon the depth of the penetration selected, as above. That is, the deep-entry fitting assembly permits installation needing less installer attention and skill, since the need for an accurate length of tubing is reduced, as is the requirement that the tubing be cut so as to provide a precisely square end surface. The deep-entry assembly also provides greater support to the tube end, giving maximized ability to resist the damaging effects of side loading or vibration. The user is also enabled to make shallow-entry assemblies which are often necessary in crowded installations, by employing a single preassembly tool or spacer for each tubing diameter size, rather than having to maintain a full supply of fitting styles and shapes, which previous art would require.

Figure 6:
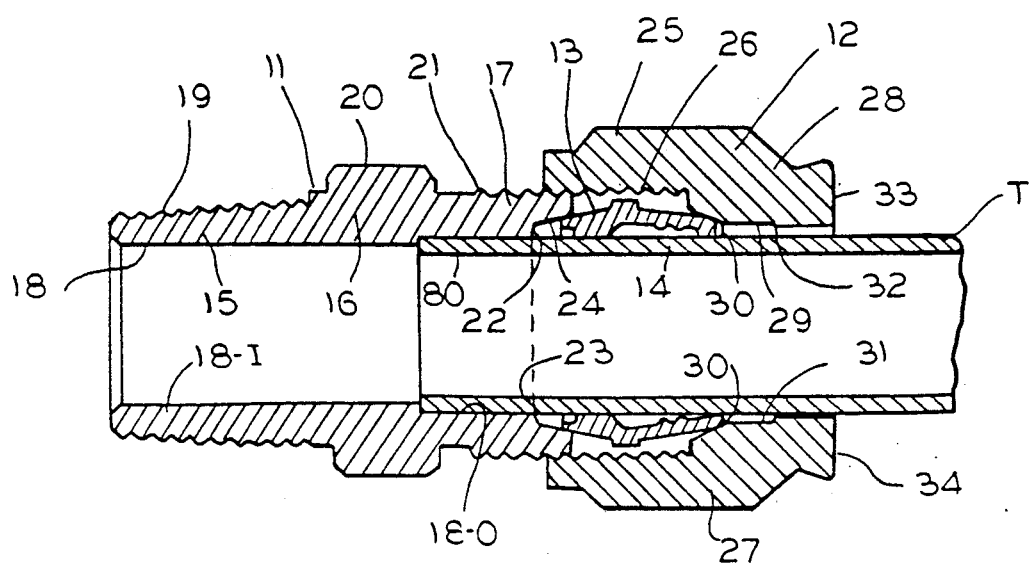
FIG. 6 is a diametric section of the fitting of FIG. 1 with the elements arranged as at the beginning of a makeup thereof, including a setup tube.

With reference to FIG. 6, the fitting 10 of FIG. 1 is shown with the use of a short tubular member 80 placed in the fitting bore outer end 18-0 before the tube end 14 is inserted. This tube member 80 acts as a spacer and is of a preselected length to position the tube end 14 for a shallow entry assembly when the tube is inserted. Thus, the tube 80 effectively replaces the need for the presetting tool 60 shown in FIG. 8.

The spacer tubular member 80 may be of the same material as the tube, or some other material having lesser physical properties, so long as it will have no adverse effect on the fluid carried in the tube. It may be loose fit in the fitting bore 18, or may be an interference fit if it is desired to press it into place permanently. If desired, the fitting connection may be disassembled, the spacer member 80 removed for reuse, and the connection may then be made.

Figure 7:
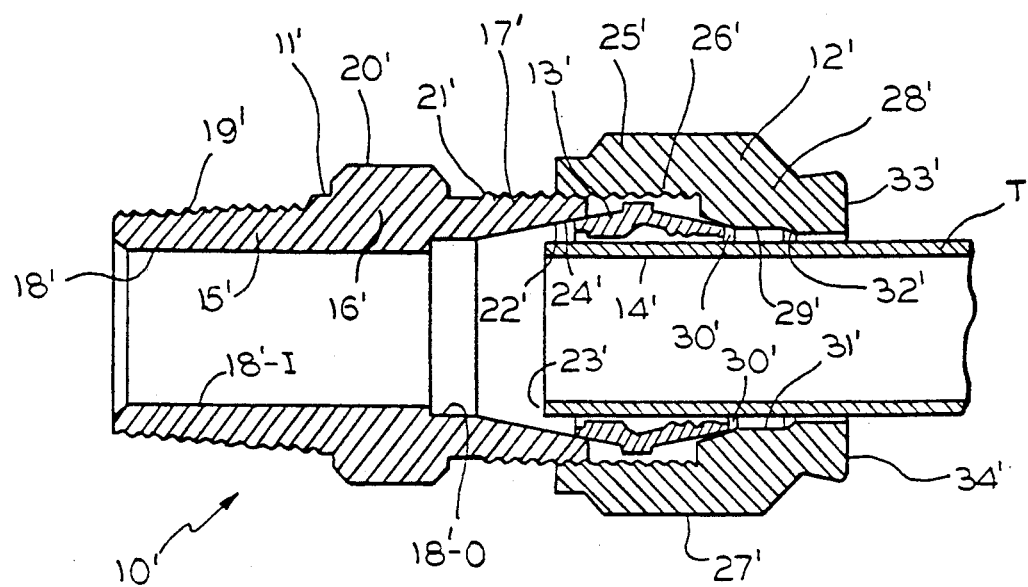
FIG. 7 is a diametric section of a fitting according to an alternative embodiment of the invention with the elements of the fitting as arranged as at the beginning of a makeup thereof.

With reference to FIG. 7, a fitting 10' is generally similar to the fitting 10 of FIGS. 1-3. Specifically, primed reference numerals are used to represent elements similar to those described above relative to FIGS. 1-3. The fitting 10' differs from the fitting 10 in that the taper 24' at the axially outer end 17' extends inwardly until it joins the wall of the counterbore outer section 18'-0. Thus, the shoulder 22 of FIG. 2 is eliminated. Such an arrangement is equally effective, and eliminates the shoulder 22 at the outer end of the counter bore, which could catch the tube end 14 and prevent it from entering into the counterbore 18'.

As should be apparent, the combination of a shallow-entry style fitting combined with a deep-entry style fitting plus the use of suitable presetting equipment, or a spacer, gives a user a fitting of greatly increased versatility and ease of assembly without increasing the number of fitting items required.

I claim:

1. A variable tube-insertion fitting system for use with straight-ended tubing, comprising:

a body member having an outer end, a bore having an opening through said outer end, said bore including an axial outer portion having a diameter greater than a diameter of the tube and extending substantially axially inwardly, an axial inner portion having a smaller diameter to define a shoulder therebetween, and an axially outwardly widening annular first cam surface concentrically about said bore opening, axially outwardly of said shoulder, said bore outer portion defining a variable tube insertion length whereby a tube can be inserted to any position between said first cam surface and said shoulder;

a nut member having a bore defining a second cam surface including an axially inner, axially outwardly narrowing frustoconical portion and a contiguous axially outer cylindrical portion;

cooperating means on said body member and nut member for forcibly advancing said second cam surface toward said outer end of the body member;

an annular sleeve member having an axially inner portion, a mid-portion, an axially outer portion, and an axial bore therethrough, said axially inner portion of the sleeve member including a radially outer, outwardly widening third can surface for engagement with said first cam surface of the body to constrict said axially inner portion of the sleeve member radially inwardly as a result of advancement of the sleeve member toward said outer end of the body and an inner cylindrical surface arranged to have facial engagement with the tube as a result of constriction of said axially inner portion of the sleeve member by said first cam surface, said axially inner portion further including an axially inner, radially inner annular recess defining an annular, sharp edge for biting into the wall of a tube and extending coaxially through said nut member and sleeve member bores into engagement with said tube stop of the body member, said mid-portion of the sleeve member including a radially inner, axially outwardly narrowing annular surface provided with radially inwardly projecting means for biting into the wall of the tube end, said mid-portion further including a radially outer, axially outwardly narrowing fourth cam surface for engagement with said second cam surface of the nut engagement with said second cam surface of the nut member to constrict said mid-portion and axially outer portion of the sleeve member radially inwardly as a result of advancement of the nut member toward said outer end of the body member, and said axially outer portion of the sleeve member including a radially inner, cylindrical surface for facial engagement with the tube, an axially inner radial surface intersecting said cylindrical surface and defining therewith a sharp edge for biting into the wall of the tube end, and a radially outer, axially outwardly narrowing fifth cam surface comprising an extension of said fourth cam surface for engagement with said second cam surface of the nut member to constrict said axially outer portion of the nut member radially inwardly as a result of the advancement of the nut member toward said outer end of the body member; and a presetting tool having a body with a first shallow bore at one end and a second deep bore at another end to selectively position said sleeve on the tube to provide for the ability to predictably selectively create with one fitting both a preset deep tube insertion fitting assembly and a shallow tube insertion fitting assembly.

2. The fitting of claim 1 wherein said edge of the annular recess in the axially inner portion of said sleeve member is defined by an axially outer surface of said recess intersecting said outer cylindrical surface of said axially inner portion of the sleeve member at substantially an obtuse angle.

3. The fitting of claim 2 wherein said axially inner surface defining the annular recess if frusto-conical widening axially inwardly.

4. The fitting of claim 1 wherein said cylindrical surface of the axially outer portion of said sleeve member has lesser axial extent than said axially outer cylindrical portion of the second cam surface of said nut member.

5. The fitting of claim 1 wherein each said bore has an outer outwardly widening frusto-conical surface defining a cam surface corresponding to said body member first cam surface.

6. The fitting of claim 1 wherein said shallow end bore has a depth slightly less than a depth of said body member first cam surface and said deep end bore has a depth slightly less than a depth of said body member bore to said shoulder.

* * * * *